(12) United States Patent
Shirakura et al.

(10) Patent No.: US 6,597,475 B1
(45) Date of Patent: Jul. 22, 2003

(54) IMAGE RECORDING APPARATUS AND IMAGE RECORDING METHOD AS WELL AS RECORDING MEDIUM

(75) Inventors: Akira Shirakura, Tokyo (JP); Nobuhiro Kihara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/527,852

(22) Filed: Mar. 17, 2000

(30) Foreign Application Priority Data

Mar. 19, 1999 (JP) .......................................... 11-076046

(51) Int. Cl.⁷ .............................. G03H 1/20; G03H 1/26; G03H 1/04
(52) U.S. Cl. ............................. 359/12; 359/23; 359/32; 359/35
(58) Field of Search .......................... 359/12, 13, 34, 359/1, 15, 30, 35

(56) References Cited

U.S. PATENT DOCUMENTS

| 3,942,861 | A | * | 3/1976 | George | 359/12 |
|---|---|---|---|---|---|
| 5,330,264 | A | * | 7/1994 | Ando et al. | 359/12 |
| 5,504,593 | A | * | 4/1996 | Hotta et al. | 359/1 |
| 5,663,815 | A | * | 9/1997 | Molteni et al. | 359/13 |
| 5,710,645 | A | * | 1/1998 | Phillips et al. | 359/34 |
| 5,993,600 | A | * | 11/1999 | Ueda et al. | 359/12 |

FOREIGN PATENT DOCUMENTS

| GB | 2 211 951 A | * | 7/1989 | 359/12 |
|---|---|---|---|---|
| JP | 07036357 A | * | 2/1995 | G03H/1/26 |

* cited by examiner

Primary Examiner—Audrey Chang
(74) Attorney, Agent, or Firm—Rader, Fishman & Grauer PLLC; Ronald P. Kananen

(57) ABSTRACT

An image recording apparatus and an image recording method can be suitably used for preparing a large number of edge-lit type holograms or holographic stereograms in a simple manner by copying. A hologram recording medium 11 is applied onto a principal surface 10a of a light-introducing block for copying 10 and held in contact with a master 15. Then, reference light L equivalent to reproducing light for reproducing the image of the master 15 is introduced into the light-introducing block for copying 10 through an end face thereof 10b.

11 Claims, 12 Drawing Sheets

IMAGE RECORDING APPARATUS AND IMAGE RECORDING METHOD AS WELL AS RECORDING MEDIUM

BACKGROUND OF THE INVENTION

1. Field of the Invention

This invention relates to an image recording apparatus and an image recording method to be suitably used for copying and recording a so-called edge-lit type hologram or holographic stereogram. The present invention also relates to a recording medium carrying an edge-lit type hologram or holographic stereogram copied and recorded thereon.

2. Prior Art

Techniques utilizing a holographic stereogram for recording a three-dimensional image on a recording medium have been known. A holographic stereogram is prepared by using a large number of images obtained by sequentially shooting a same object from so many viewing points and sequentially recording them as originals on a single hologram recording medium.

Of various known types of holographic stereogram, there is one with which the viewing points are shifted only horizontally to obtain a large numeral of images that are differentiated from each other by parallax, which are then sequentially recorded on a single hologram recording medium as so many strip-shaped element holograms.

Referring to FIG. 1 of the accompanying drawings, a plurality of originals 201a through 201e obtained by sequentially shooting an object 200 from so many viewing points that are shifted only horizontally from each other are then sequentially recorded on a hologram recording medium 202 as so many strip-shaped element holograms.

Thus, with such a holographic stereogram, since the images obtained by sequentially shooting the object from so many viewing points that are shifted only horizontally from each other are sequentially recorded on a recording medium as so many strip-shaped element holograms, the two eyes of the viewer watching the holographic stereogram will catch respective two-dimensional images that are slightly different from each other. Then, the viewer will be made to feel a parallax and see a three-dimensional image due to the principle of stereogram.

Meanwhile, when reproducing a holographic stereogram prepared in a manner as described above, the light source to be used for reproducing a three-dimensional image and the holographic stereogram to be reproduced are normally separated from each other within a space. In other words, a relatively large space is required to reproduce a holographic stereogram. Additionally, the holographic stereogram to be reproduced and the light source to be used for reproducing the holographic stereogram have to be arranged in such a way that they satisfy certain predetermined requirements in order to reproduce the holographic stereogram under optimal conditions. Thus, cumbersome operations are inevitably involved there.

As an attempt for dissolving the above identified problems and reproducing a three-dimensional image without difficulty, there has been proposed an edge-lit type holographic stereogram using a recording medium bonded to a transparent light-introducing block by way of an index-matching solution so that an image may be recorded there by introducing reference light through an end face of the light-introducing block and the recorded image may be reproduced by causing light to strike the end face of the light-introducing block for image reproduction.

With such an edge-lit type holographic stereogram, the light source for emitting light for image reproduction can be integrated with the light-introducing block to down-size the reproduction optical system and always carry out the image reproduction operation under optimal conditions. Additionally, such an edge-lit type holographic stereogram provides an advantage that the recorded image cannot be reproduced with light entering from the outside of the light-introducing block because of a large angle of incidence of light used for image reproduction.

Thus, because of the above identified various advantages, edge-lit type holographic stereograms may possibly find applications in ordinary image display apparatus. Then, a large number of holographic stereograms carrying same and identical image information may have to be prepared.

Thus, it is an object of the present invention to provide an image recording apparatus and an image recording method to be suitably used for preparing a large number of edge-lit type holograms or holographic stereograms in a simple manner by copying. Another object of the present invention is to provide a recording medium carrying an edge-lit type hologram or holographic stereogram copied and recorded thereon.

BRIEF SUMMARY OF THE INVENTION

In an aspect of the invention, there is provided an image recording apparatus for copying and recording the image information recorded on a master such as a hologram or a holographic stereogram carrying thereon the image information recorded by using interference of object light and reference light on some other recording material, said image recording apparatus comprising:

an exposure processing section for causing reading light for reproducing the image information recorded on said master to strike an end face of said optical member, said recording material being laid on said master, said master and said recording material being optically held in contact with a light-transmitting block-shaped optical member;

the reproduction light from said master reproduced by said reading light being caused to interfere with said reading light in said recording material to copy and record the image information recorded on said master on said recording material.

With an image recording apparatus according to the invention and having a configuration as described above, the recording material is laid on the master in the exposure processing section and optically brought into with the light-transmitting block-shaped optical member. Then, reading light for reproducing the image information recorded on the master is made to strike an end face of the optical member. Note that, in this patent document, a block refers to a rigid and solid block having a height greater than an ordinary picture film.

The reading light striking an end face of the optical member is then modulated as a function of the image information recorded on the master as it irradiates the master to become reproduction light. Then, as the reproduction light from the master and said reading light interfere with each other in said recording material, the image information recorded on the master is copied and recorded on the recording material.

With an image recording apparatus according to the invention and having a configuration as described above, the image information recorded on the master can be copied and recorded with ease simply by laying the recording material on the master, bringing them into optically in contact with the block-shaped optical member and making reading light for reproducing the image information recorded on the master to strike an end face of the optical member.

Preferably, said optical member is provided at least in part thereof other than the portion to be optically held in contact with said master and said recording material and the end face to be stricken by said reading light with a light absorption means for absorbing light. With the provision of such a light absorption means, the reading light entering the optical member is prevented from being unnecessarily reflected inside said optical member so that the operation of copying and recording the image information can be carried out optimally.

In another aspect of the invention, there is provided an image recording method for copying and recording the image information recorded on a master such as a hologram or a holographic stereogram carrying thereon the image information recorded by using interference of object light and reference light on some other recording material, said image recording method comprising:

causing reading light for reproducing the image information recorded on said master to strike an end face of said optical member, said recording material being laid on said master, said master and said recording material being optically held in contact with a light-transmitting block-shaped optical member;

causing the reproduction light from said master reproduced by said reading light to interfere with said reading light in said recording material to copy and record the image information recorded on said master on said recording material.

With an image recording method according to the invention, the image information recorded on the master can be copied and recorded with ease simply by laying the recording material on the master, bringing them into optically in contact with the block-shaped optical member and causing reading light for reproducing the image information recorded on the master to strike an end face of the optical member.

Preferably, said optical member is provided at least in part thereof other than the portion to be optically held in contact with said master and said recording material and the end face to be stricken by said reading light with a light absorption means for absorbing light. With the provision of such a light absorption means, the reading light entering the optical member is prevented from being unnecessarily reflected inside said optical member so that the operation of copying and recording the image information can be carried out optimally.

In still another aspect of the invention, there is provided a recording medium carrying image information copied and recorded by using a master such as a hologram or a holographic stereogram carrying thereon the image information recorded by using interference of object light and reference light on some other recording material;

said image information recorded on said master being copied and recorded as interference fringes of the reproduction light from said master reproduced by reading light and said reading light by causing said reading light for reproducing the image information recorded on said master to strike an end face of said optical member, said recording material being laid on said master, said master and said recording material being optically held in contact with a light-transmitting block-shaped optical member.

In a recording medium according to the invention, the image information recorded on the master is copied and recorded with ease simply by laying the recording material on the master, bringing them into optically in contact with the block-shaped optical member and causing reading light for reproducing the image information recorded on the master to strike an end face of the optical member.

Thus, with an image recording apparatus according to the invention, an edge-lit type hologram or holographic stereogram can be prepared with ease because the image information recorded on a master can be copied and recorded on a recording material simply by laying the recording material on the master in the exposure processing section, bringing them into optically in contact with the block-shaped optical member and causing reading light for reproducing the image information recorded on the master to strike an end face of the optical member.

Similarly, with an image recording method according to the invention, an edge-lit type hologram or holographic stereogram can be prepared with ease because the image information recorded on a master can be copied and recorded on a recording material simply by laying the recording material on the master, bringing them into optically in contact with the block-shaped optical member and causing reading light for reproducing the image information recorded on the master to strike an end face of the optical member.

Finally, with a recording medium according to the invention, the image information recorded on the master is copied and recorded with ease simply by laying the recording material on the master, bringing them into optically in contact with the block-shaped optical member and causing reading light for reproducing the image information recorded on the master to strike an end face of the optical member. Such a recording medium can be used for an edge-lit type hologram or holographic stereogram.

BRIEF DESCRIPTION OF THE DRAWINGS

FIGS. 2A and 2B are schematic illustrations of a holographic stereogram printer for preparing a holographic stereogram to be used as master, of which FIG. 2A is a schematic plan view of the entire optical system of the holographic stereogram printer and FIG. 2B is a schematic lateral view of the optical system for object light.

FIGS. 5A and 5B are schematic illustrations of the operation of the embodiment of FIG. 4, of which FIG. 5A is a schematic illustration of the light-introducing block located at a first position and FIG. 5B is a schematic illustration of the light-introducing block located at a second position.

FIGS. 6A through 6C are also schematic illustrations of the operation of the embodiment of FIG. 4, of which FIG. 6A is a schematic illustration of the master application roller located at a third position, FIG. 6B is a schematic illustration of the master application roller located at a fourth position and FIG. 6C is a schematic illustration of the master application roller moved to the opposite end.

FIGS. 8A and 8B are also schematic illustrations of the operation of the embodiment of FIG. 4, of which FIG. 8A is a schematic illustration of a reproduction block supplied from the reproduction block supply section and FIG. 8B is a schematic illustration of the reproduction block to which a hologram recording medium carrying a copied and recorded image thereon is applied.

FIGS. 10A through 10C are schematic illustrations of the operation of a second embodiment of image recording apparatus according to the invention, of which FIG. 10A is a schematic illustration of a hologram recording medium wound on the peripheral surface of the cylindrical copying light-introducing block, FIG. 10B is a schematic illustration of the copying light-introducing block brought into contact with the master and FIG. 10C is a schematic illustration of a hologram recording medium and the master laid one on the other and wound around the peripheral surface of the copying light-introducing block.

FIGS. 13A and 13B are schematic illustrations of the operation of a third embodiment of image recording apparatus according to the invention, of which FIG. 13A is a schematic illustration showing that a reproduction block to which a hologram recording medium is applied in advance is fed to the exposure position and FIG. 13B is a schematic illustration showing that the reproduction block to which a hologram recording medium is applied in advance is brought into contact with the master.

DETAILED DESCRIPTION OF THE INVENTION

Now, the present invention will be described in detail by referring to the accompanying drawings that illustrate preferred embodiments of the invention.

According to the invention, a so-called edge-lit type hologram or holographic stereogram is used as master and a copy of the hologram or the holographic stereogram is obtained by copying and recording the master on some other recording material. While an edge-lit type holographic stereogram is used as master to prepare a copy thereof, which is also a holographic stereogram, in the following description, the description equally applies to an edge-lit type hologram.

Before describing the present invention in detail, a method of preparing an edge-lit type holographic stereogram as master will be firstly discussed.

Figure 1:
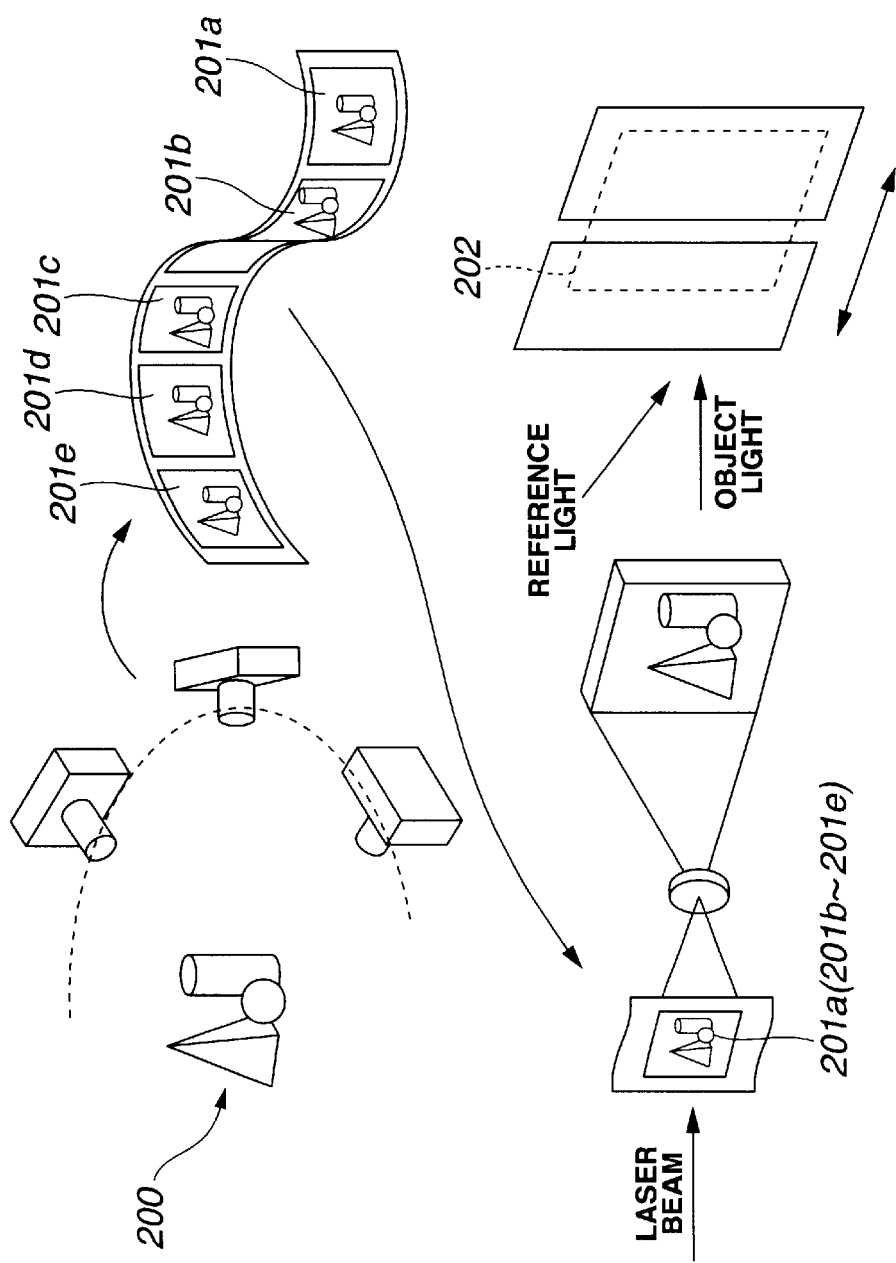
FIG. 1 is a schematic illustration of the procedure of preparing a holographic stereogram.
Figure 2A:
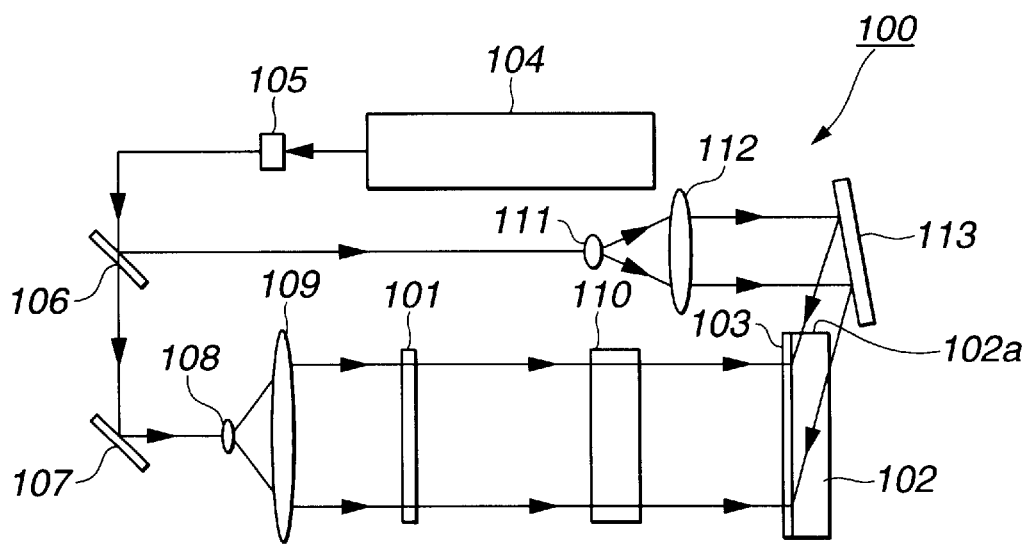
Figure 2B:
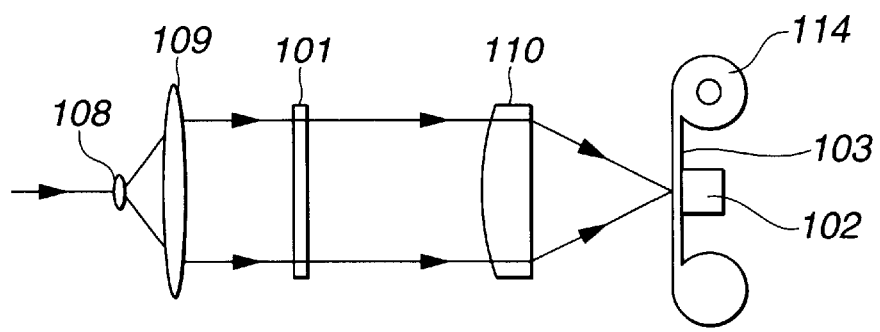

An edge-lit type holographic stereogram to be used as master may be prepared by means of a holographic stereogram printer as shown in FIGS. 2A and 2B. Referring to FIGS. 2A and 2B, the holographic stereogram printer 100 drives an optical modulator 101 such as an LCD according to the image data of an array of parallactic images fed from a control computer (not shown) and the object light obtained by the modulating operation of the optical modulator 101 is made to strike hologram recording medium 103 that is held in contact with a light-introducing block 102, while reference light is made to strike an end face of the light-introducing block 102 and also the hologram recording medium 103 with an acute angle of incidence so that the object light and the reference light interfere with each other to produce interference fringes, which are then used to sequentially record the images according to the image data on the hologram recording medium 103 as strip-shaped element holograms for an edge-lit type holographic stereogram.

More specifically, for preparing an edge-lit type holographic stereogram that are parallactic only horizontally by means of the holographic stereogram printer 100, a laser beam is emitted from a laser beam source 104 and the optical modulator 101 is driven according to the image data fed from the control computer so as to display images on the optical modulator 101 according to the image data. Then, as shutter 105 is opened according to the control signal from the control computer, the laser beam emitted from the laser beam source 104 is allowed to strike spatial filter 108 by way of a half-mirror 106 and a mirror 107.

The laser beam entering the spatial filter 108 is then made divergent by the spatial filter 108 and collimated by collimator lens 109. The laser beam collimated by the collimator lens 109 is then made to pass through the optical modulator 101 and converted into projectional light that varies as a function of the image displayed on the optical modulator 101. The projectional light is then horizontally converged by cylindrical lens 110 and made to strike the hologram recording medium 103 that is optically held in contact with the light-introducing block 102.

Meanwhile, the part of the laser beam reflected by the half-mirror 106 is made to sequentially pass through a cylindrical lens 111, a collimator lens 112 and mirror 113 and enter the light-introducing block 102 by way of end face 102a of the light-introducing block 102. The laser beam entering the light-introducing block 102 is then made to strike the hologram recording medium 103 as reference light with an acute angle of incidence at the rear surface of the hologram recording medium 103.

As a result, the object light and the reference light interfere with each other in the hologram recording medium 103 to produce interference fringes, which are then used to record the image that is displayed on the optical modulator 101 on the hologram recording medium 103 as strip-shaped element hologram.

When the operation of recording the single image is completed, the shutter 105 is closed according to the control signal issued by the control computer to block the laser beam emitted from the laser beam source 104 and the operation of the optical modulator 101 is stopped. Then, printer head 114 is driven under the control of the control computer and the hologram recording medium 103 that is held by the printer head 114 is shifted horizontally by a distance corresponding to an element hologram.

Thereafter, the optical modulator 101 is driven once again under the control of the control computer and the next image is displayed on the optical modulator 101 according to the image data from the control computer, while the shutter 105 is opened once again. As a result, the object light modulated according to the next image displayed on the optical modulator 101 and the reference light are allowed to enter the hologram recording medium 103 so that the next element hologram is recorded in the hologram recording medium 103.

The above described sequence for recording an element hologram is repeated to sequentially record images according to the image data for the array of parallactic images as strip-shaped element holograms so that consequently an edge-lit type holographic stereogram that is horizontally parallactic is finally prepared.

The edge-lit type holographic stereogram prepared in a manner as described above is then applied onto a transparent optical member similar to the light-introducing block 102 used for the recording operation and can be reproduced by irradiating it with reproducing light that strikes a corresponding end face of the optical member with an angle of incidence equal to that of the reference light used for the recording operation.

Figure 3:
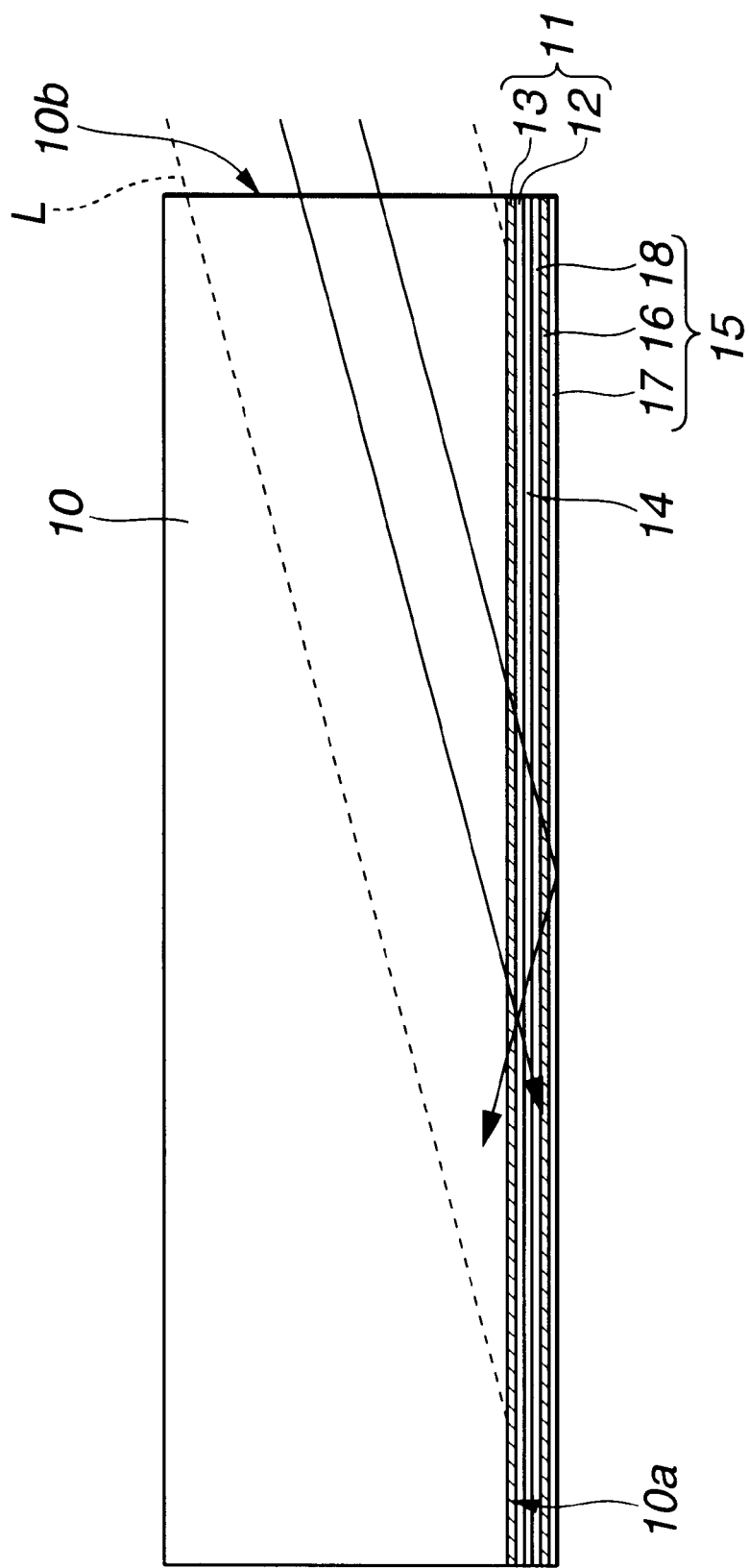
FIG. 3 is a schematic illustration of the principle underlying an image recording method according to the invention.

The edge-lit type holographic stereogram prepared in a manner as described above is then used as master and the image of the master is copied and recorded on some other hologram recording medium by means of the image recording method according to the invention in a manner as described below by referring to FIG. 3. Note that FIG. 3 only illustrates a mode of carrying out the invention and the present invention is by no means limited thereto.

For copying and recording the image of the master onto some other hologram recording medium with the image recording method according to the invention, firstly, a hologram recording medium 11 for copying and recording a master is applied onto a transparent optical member (to be referred to as light-introducing block for copying 10 hereinafter) similar to the light-introducing block 102 used for preparing the master. Generally, a hologram recording medium 11 comprises a base film 12 made of a colorless and transparent resin material, a holographic material 13 arranged on the base film 12 and a protection film applied on to the holographic material 13. When applying the hologram recording medium 11 onto a principal surface 10a of a light-introducing block for copying 10, the protection film is peeled off to expose the holographic material 13 so that the hologram recording medium 11 may be bonded to the principal surface 10a of the light-introducing block for copying 10 due to the adhesive effect of the holographic material 13. Care should be taken to tightly put the light-introducing block for copying 10 and the hologram recording medium 11 together so that air and/or dust may not enter therebetween.

Then, the master 15 is brought into contact with the hologram recording medium 11 applied onto the principal surface 10a of the light-introducing block for copying 10 by way of an index-matching solution 14. The index-matching solution 14 is used to eliminate any air that can intervene between the hologram recording medium 11 and the master when they are brought into contact with each other so that light may be properly transmitted therethrough because the difference between their refractive indexes can become intolerable if air is trapped therebetween.

As pointed out above, the master 15 has a holographic material 16 where image information is recorded that is sandwiched between a base film 17 made of a colorless and transparent resin material and a protection film 18 also made of a colorless and transparent resin material. The protection film 18 is applied onto the holographic material 16 carrying the image information recorded thereon in order to protect the holographic material 16 after preparing the holographic stereogram as master 15 by recording the image information in a manner as described above. In the illustrated instance of FIG. 3, it is the protection film 18 that is actually brought into contact with the hologram recording medium 11 by way of the index-matching solution 14. The holographic material 16 of the master 15 may alternatively be brought into contact with the hologram recording medium 11 after peeling off the protection film 18. Still alternatively, the holographic material 16 of the master 15 may be applied onto an about 0.2 mm thick transparent optical member before it is brought into contact with the hologram recording medium 11.

After applying the hologram recording medium 11 onto a principal surface 10a of the light-introducing block for copying 10 and bringing the master 15 into contact with the hologram recording medium 11 with the index-matching solution 14 interposed therebetween in a manner as described above, reference light L that is equivalent to reproducing light for irradiating the master 15 is made to enter the light-introducing block for copying 10 through an end face 10b thereof.

The reference light L entering the light-introducing block for copying 10 is transmitted through the hologram recording medium 11 and then enters the master 15, where it is totally reflected by the base film 17 of the master 15. The reference light L totally reflected by the base film 17 is then made to irradiate the holographic material 16 of the master 15 to reproduce the image recorded in the holographic material 16.

The reproducing light of the master 15 is then made to reenter the holographic material 13 of the hologram recording medium 11 as object light. The reproducing light (object light) of the master 15 reentering the holographic material 13 of the hologram recording medium 11 interfere with the reference light L that is made to enter the light-introducing block for copying 10. Then, the interference fringes produced by the interference of the reproducing light (object light) of the master and the reference light L are recorded in the holographic material 13 of the hologram recording medium 11 so that the image recorded in the master 15 is copied and recorded in the hologram recording medium 11.

While the hologram recording medium 11 is applied onto a principal surface 10a of the light-introducing block for copying 10 and the master is brought into contact with the hologram recording medium 11 with an index-matching solution 14 interposed therebetween before reference light L is made to enter the light-introducing block for copying 10 by way of an end face 10b thereof and the reproducing light of the master 15 reproduced by the reference light L totally reflected by the base film 17 of the master 15 is made to interfere with the reference light in the hologram recording medium 11 to copy and record the image recorded in the master 15 in the hologram recording medium 11 in the above instance, the present invention is by no means limited to the above instance. For example, the positional relationship between the hologram recording medium 11 and the master 15 may be reversed and the master 15 may be applied onto a principal surface 10a of the light-introducing block for copying 10 and brought into contact with the hologram recording medium 11 so that reference light L is made to strike an end face 10b of the light-introducing block for copying 10 and the reference light L and the reproducing light of the master 15 reproduced by the reference light L are made to interfere with each other in order to copy and record the image stored in the master 15 in the hologram recording medium 11.

Now, an image recording apparatus according to the invention and adapted to copy and record the image of a master 15 in a hologram recording medium 11 on the basis of the above discussed principle will be described below.

Figure 4:
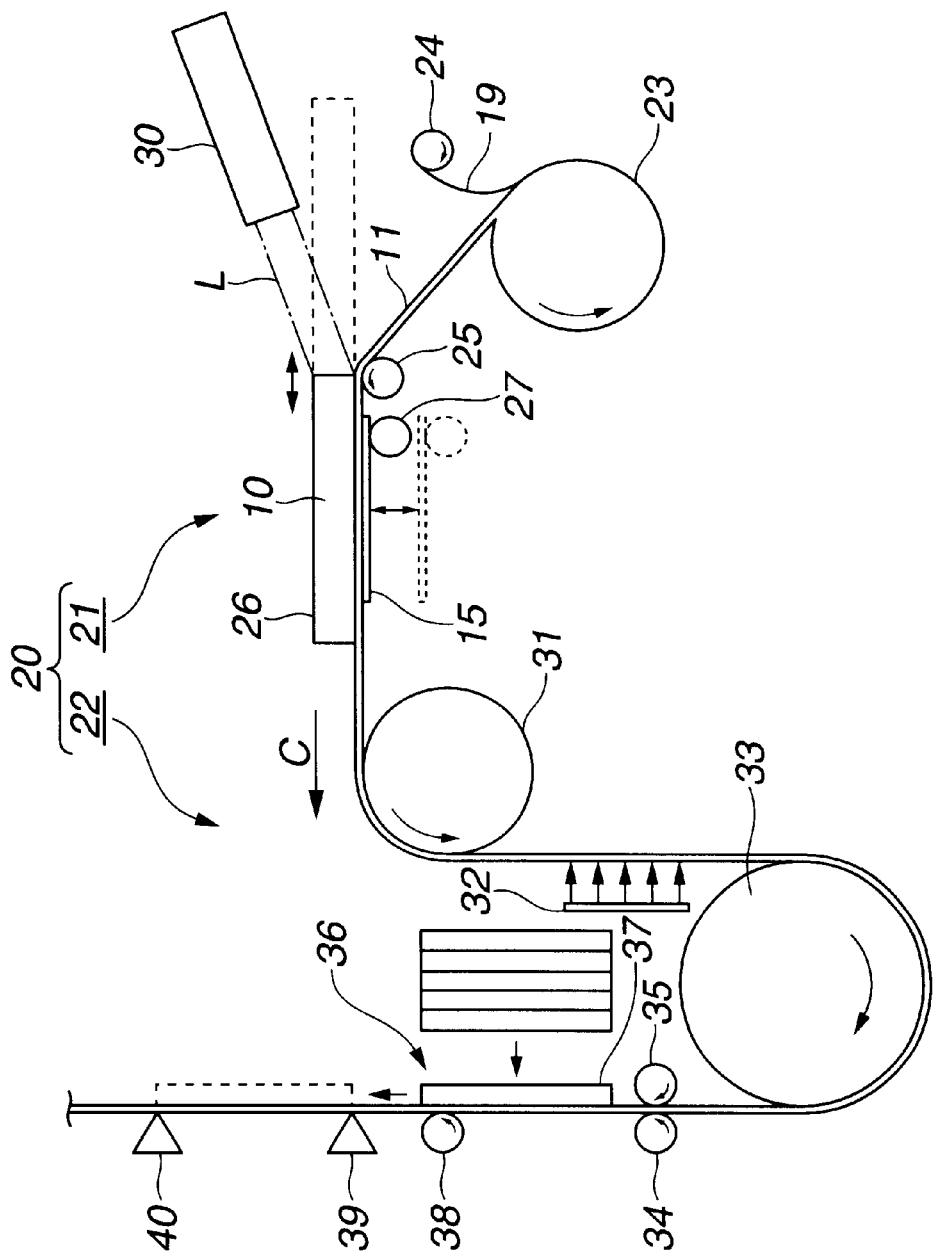
FIG. 4 is a schematic illustration of a first embodiment of image recording apparatus according to the invention.

FIG. 4 is a schematic illustration of an embodiment of image recording apparatus according to the invention. Referring to FIG. 4, the image recording apparatus 20 comprises a first processing section (exposure processing section) 21 for exposing a master 15 to light while holding the master 15 and a hologram recording medium 11 in optical contact with a light-introducing block for copying 10 and copying and recording the image of the master 15 in the hologram recording medium 11 and a second processing section 22 for bonding the hologram recording medium 11 carrying the image copied and recorded from the master 15 and processed by ultraviolet irradiation and heating to a light-introducing block for image reproduction.

For copying and recording the image of the master 15 in the hologram recording medium 11 by means of the image recording apparatus 20, firstly, the hologram recording medium 11 is wound around roller 23 and set in position in the image recording apparatus 20. In this embodiment, the hologram recording medium 11 is a film prepared by arranging a holographic material 13 that is a photo-polymer having a refractive index of 0.494 on a base film 12 having a refractive index of 1.5 and applying a protection film 19 onto the holographic material 13. Note that the protection film 19 is taken up by protection film take-up roller 24 when the hologram recording medium 11 is fed out from roller 23.

Figure 5A:
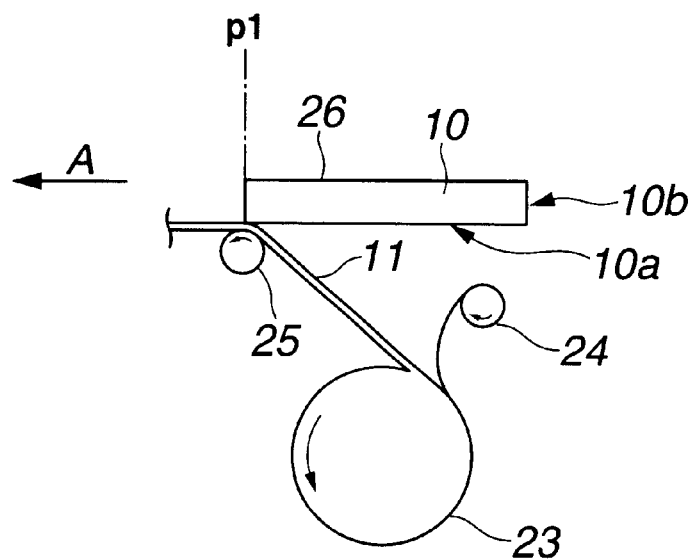
Figure 5B:
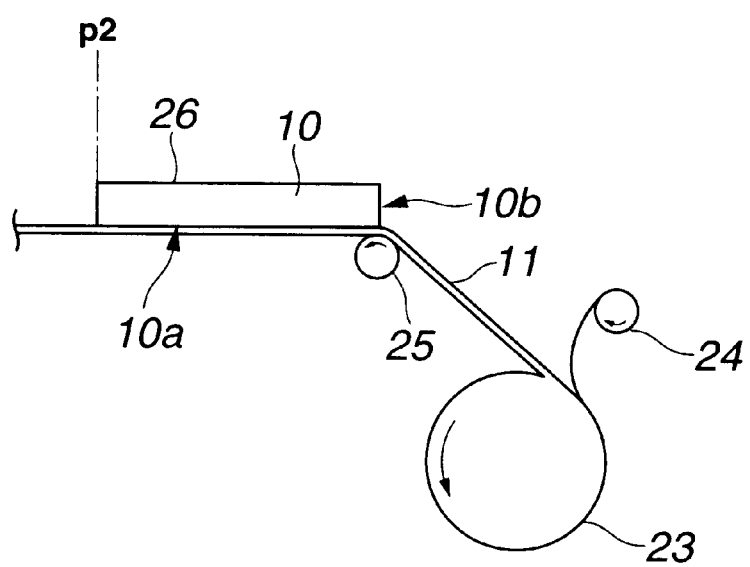

Referring now FIGS. 5A and 5B illustrating the first processing section 21, light-introducing block for copying 10 is moved along arrow A in FIG. 5A from first position p1 that is separated from a predetermined exposure station to second position p2 where the predetermined exposure station is located. When the light-introducing block for copying 10 is located at the first position p1, hologram recording medium 11 is pressed against an end of one of the principal surfaces 10a of the light-introducing block for copying 10 by means of a press roller 25. When, on the other hand, the light-introducing block for copying 10 is moved to the second position p2, the press roller 25 is located at the other end of the principal surface 10a of the light-introducing block for copying 10 so that the hologram recording medium 11 is applied onto the principal surface 10a of the light-introducing block for copying 10 to extend between the first end to the second end thereof.

The light-introducing block for copying 10 is typically a rectangular plate of colorless and transparent glass such as BK7. Reference light that is equivalent to reproducing light for reproducing the image of the master 15 is made to enter the light-introducing block for copying 10 by way of one of its end faces 10b. Thus, it is desirable that the end face 10b of the light-introducing block for copying 10 through which reference light is introduced is mirror-polished to improve the precision level of the entire operation.

In view of the fact that the reference light made to enter the light-introducing block for copying 10 through the end face 10b is then transmitted through the light-introducing block for copying 10 to irradiate the hologram recording medium 11 applied onto one of the principal surfaces, or principal surface 10a of the light-introducing block 10, it is also desirable that the light-introducing block for copying 10 shows an enhanced level of uniformity in terms of the quality of glass. While the light-introducing block for copying 10 is made of glass (BK7) in the above description, it may alternatively be made of a material other than glass such as a plastic material. Note, however, if a plastic material is used, both the quality of the plastic material and the axis of birefringence have to be taken into consideration in order to minimize the rotation of the plane of polarization of reference light that can be caused by the birefringence.

All the surfaces of the light-introducing block for copying 10 are preferably provided with a light absorbing member 26 typically made of black film except the principal surface 10a to which the hologram recording medium 11 is applied and the end face 10b through which reference light is introduced. By arranging a light absorbing member 26 on all the surfaces of the light-introducing block for copying 10 that are not required to transmit light, the reference light introduced into the light-introducing block for copying 10 is prevented from being unnecessarily reflected within the light-introducing block for copying 10 so that the problem of recording unnecessary interference fringes in the light-introducing block for copying 10 can be successfully avoided. Light absorbing members 26 that can be used for the purpose of the invention may be so many pieces of black vinyl tape applied to the respective surfaces of the light-introducing block for copying 10 or a black paint applied to the related surfaces of the light-introducing block for copying 10.

Figure 6A:
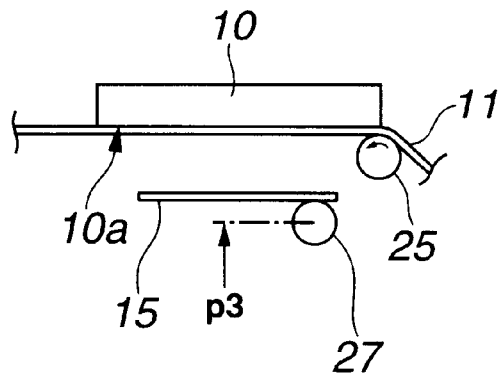
Figure 6B:
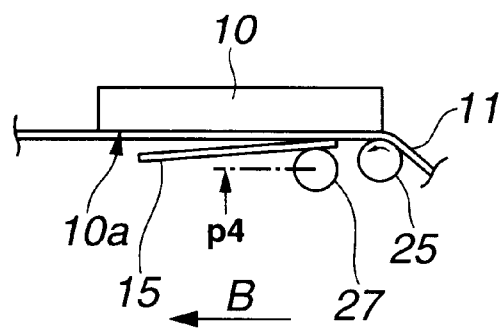
Figure 6C:
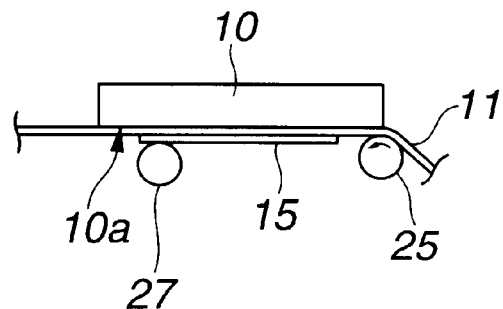

Now, referring to FIGS. 6A and 6B, master applying roller 27 is moved from third position p3 separated from the light-introducing block for copying 10 that has been moved to the second position p2 to fourth position p4 located close to the light-introducing block for copying 10. As a result, the master 15 is also moved to a position close to the light-introducing block for copying 10 with an end thereof held in contact with the hologram recording medium 11 applied onto the principal surface 10a of the light-introducing block for copying 10. Note that the master 15 is prepared by applying the holographic material carrying an image recorded there onto a glass base member having a refractive index of 1.51.

Then, as shown in FIGS. 6A and 6B, the master applying roller 27 is operated to move from an end to the opposite of the master 15 along the direction indicated by arrow B in FIG. 6B. As a result, the master 15 is entirely brought into tight contact with the principal surface 10a of the light-introducing block for copying 10 and thus the light-introducing block for copying 10, the hologram recording medium 11 and the master 15 are optically held in contact with each other and integrally united.

At this stage of operation, it is desirable that an index-matching solution 14 fed from a liquid supply means (not shown) is filled between the hologram recording medium 11 and the master 15. As an index-matching solution 14 is filled between the hologram recording medium 11 and the master 15, the air, if any, remaining between them is driven out so that light may be properly transmitted therethrough because the difference between their refractive indexes can become intolerable if air is trapped therebetween.

Figure 7:
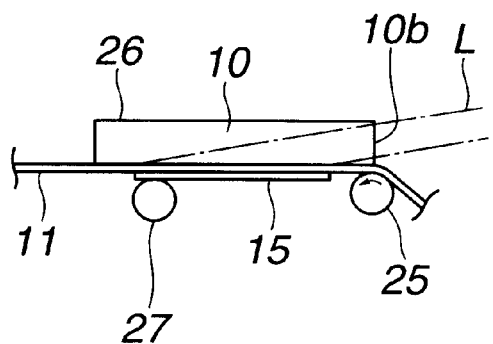
FIG. 7 is also a schematic illustration of the operation of the embodiment of FIG. 4, showing reference light striking an end face of the light-introducing block to be used for copying the image information.

Then, as shown in FIG. 7, while keeping the hologram recording medium 11 and the master 15 held in contact with the principal surface 10a of the light-introducing block for copying 10, reference light L is emitted from reference light optical system 30 into the light-introducing block for copying 10 by way of the end face 10b thereof. Note that reference light L is equivalent to reproducing light for reproducing the image of the master 15.

The reference light L entered into the light-introducing block for copying 10 is then transmitted through the hologram recording medium 11 and reflected by the base film of the master 15. Then, the reflected light is transmitted once again through the master 15 to reproduce the image recorded in the master 15. The reproducing light of the master 15 is then reentered into the hologram recording medium 11 as object light. The reproducing light (object light) of the master 15 that is reentered into the hologram recording medium 11 interfere with the reference light L in the hologram recording medium 11 to produce interference fringes, which are then recorded in the hologram recording medium 11. As a result, the image stored in the master 15 is copied and recorded in the hologram recording medium 11.

After the end of the exposure process, the master applying roller 27 is moved back to the third position p3 that is separated from the light-introducing block for copying 10 and the master is peeled off from the hologram recording medium 11, while the light-introducing block for copying 10 is moved back from the second position p2 to the first position pl. Then, as the hologram recording medium 11 is fed along arrow C in FIG. 4, the portion of the hologram recording medium 11 that now carries the image that has been copied and recorded from the master 15 is moved downstream from the exposure station and the portion of the hologram recording medium 11 succeeding the portion now carrying the image that has been copied and recorded from the master 15 is aligned with the exposure station.

By repeating the above sequence of operation, the image stored in the master 15 is repeatedly copied and recorded in the hologram recording medium 11.

The portion of the hologram recording medium 11 where the image is copied and recorded is then guided by roller 31 to the second processing section 22, where ultraviolet rays are irradiated onto it from an ultraviolet lamp 32. As the portion of the hologram recording medium 11 now carrying the copied and recorded image is irradiated with ultraviolet rays from the ultraviolet lamp 32, the process of polymerizing the monomer of the portion of the photo-polymer of the holographic material 13 exposed to ultraviolet rays is completed.

Then, the portion of the hologram recording medium 11 now carrying the copied and recorded image is heated by means of heat roller 33 arranged downstream relative to the ultraviolet lamp 32. As a result, the portion of the hologram recording medium 11 now carrying the copied and recorded image raises its degree of modulation of the refractive index of the photo-polymer of the holographic material 13 so that the copied and recorded image is fixed.

Then, the portion of the hologram recording medium 11 carrying the copied and recorded image is guided by a pair of guide rollers 34, 35 and moved to reproduction block supply section 36. The reproduction block supply section 36 is designed to feed a reproduction block that is typically a rectangular plate of a transparent plastic material each time a portion of the hologram recording medium 11 carrying a copied and recorded image is moved to it.

Figure 8A:
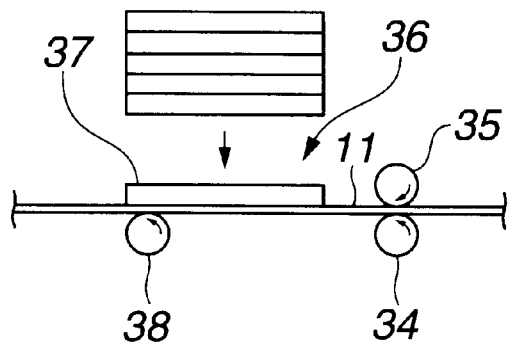

Referring to FIG. 8A, the reproduction block 37 fed from the reproduction block supply section 36 is firstly brought into contact with the portion of the hologram recording medium 11 carrying the copied and recorded image. More specifically, press roller 38 is made to abut an end of the reproduction block 37 with the hologram recording medium 11 sandwiched between them.

Figure 8B:
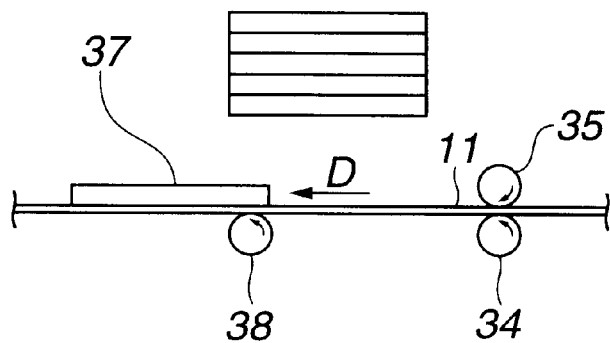
Figure 9:
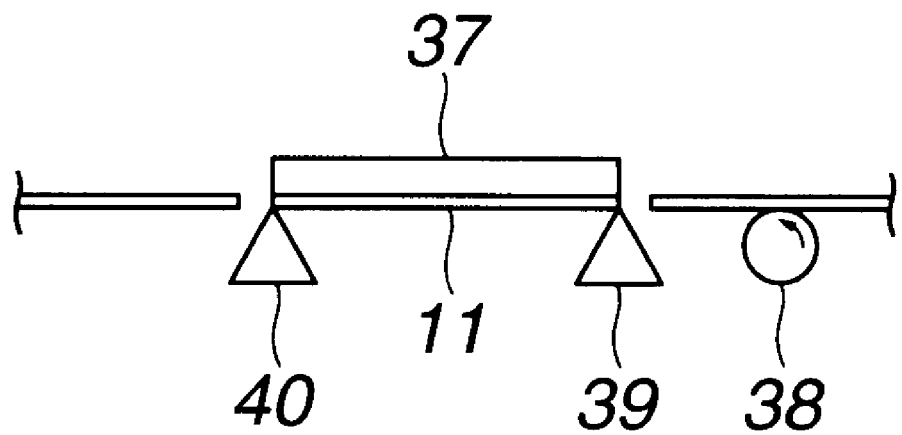
FIG. 9 is also a schematic illustration of the operation of the embodiment of FIG. 4, showing a hologram recording medium cut apart by means of a cutter.

Now, referring to FIG. 8B, as the hologram recording medium 11 is moved further downstream with the reproduction block 37 along the direction indicated by arrow D in FIG. 8B, the press roller 38 will eventually come to be aligned with the other end of the reproduction block 37 with the hologram recording medium 11 sandwiched between them. As a result, the portion of the hologram recording medium 11 carrying the copied and recorded image is entirely pressed against and applied onto a principal surface of the reproduction block 37 by the press roller 38.

While the reproduction block 37 is a rectangular plate of a transparent plastic material in the above description, the reproduction block 37 is by no means limited thereto and may alternatively be a glass plate as in the case of the light-introducing block for copying 10 and the base member of the master 15.

Additionally, the reproduction block 37 may have a profile other than that of a rectangular plate. For example, it may have a cylindrical. If the reproduction block 37 has a cylindrical profile and the portion of the hologram recording medium 11 carrying the copied and recorded image is applied onto the peripheral surface of the cylinder, the obtained holographic stereogram will also show a cylindrical profile.

As the portion of the hologram recording medium 11 carrying the copied and recorded image is applied onto the principal surface of the reproduction block 37, that portion of the hologram recording medium 11 is cut apart from the remaining hologram recording medium 11 by means of a pair of cutters 39, 40 and delivered to the outside. Thus a complete edge-lit type holographic stereogram carrying an image copied and recorded from the master 15 is prepared.

While the embodiment of image recording apparatus 20 is adapted to use a light-introducing block for copying 10 having a profile of a rectangular plate for copying and recording the image of a master 15 in the hologram recording medium 11 in the above description, the present invention is by no means limited thereto. A light-introducing block for copying having a profile other than that of a rectangular plate may alternatively be used for the purpose of the invention. For instance, the light-introducing block for copying may have a cylindrical profile and the master 15 may be applied onto the peripheral surface of a glass-made cylindrical base member. Then, the image of the master 15 may equally be copied and recorded in a hologram recording medium 11. Now, an embodiment of image recording apparatus according to the invention and adapted to use a cylindrical light-introducing block for copying will be described below. Since this embodiment of image recording apparatus have a configuration basically same as the first embodiment of image recording apparatus, the components that are same or similar to those of the first embodiment will be denoted by the same reference symbols and will not be described any further. Additionally, since the second processing section 22 of the second embodiment where the hologram recording medium 11 carrying a copied and recorded image is poste-processed is exactly same as that of the first embodiment, only the first processing section 21 will be described and the description of the second processing section 22 will be omitted.

Figure 10A:
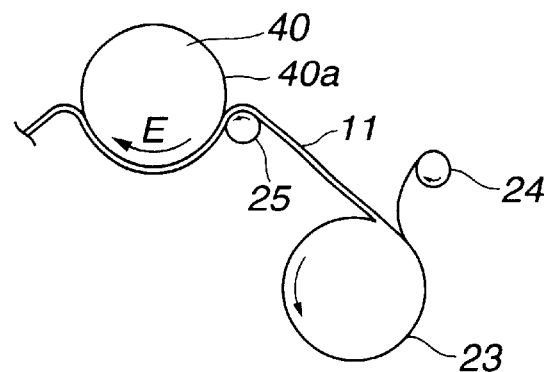

When copying and recording the image of the master 15 applied onto the peripheral surface of a glass-made cylindrical base member in a hologram recording medium 11 with this embodiment of image recording apparatus, firstly, the hologram recording medium 11 is wound around roller 23 and placed in position in the image recording apparatus. Then, as shown in FIG. 10A, a cylindrical light-introducing block for copying 40 is driven to rotate in the sense indicated by arrow E in FIG. 10A. As a result, the portion of the hologram recording medium 11 pulled out from the roller 23 is wound on the peripheral surface 40a of the light-introducing block for copying 40.

Figure 10B:
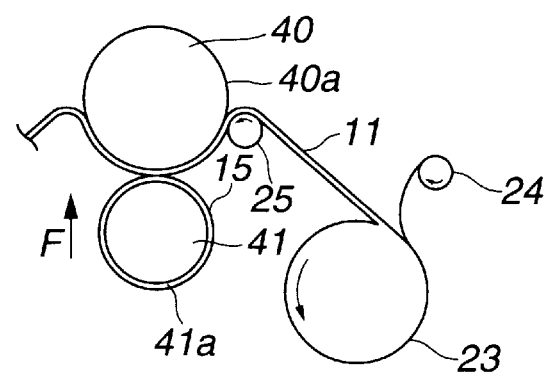

Then, as shown in FIG. 10B, the glass-made cylindrical base member 41 carrying the master 15 applied onto the peripheral surface 41a thereof is moved closer to the light-introducing block for copying 40 along the direction indicated by arrow F in FIG. 10B so that consequently the master 15 would around the peripheral surface 41a of the glass-made base member 41 is brought into contact with the hologram recording medium 11 wound around the peripheral surface 40a of the light-introducing block for copying 40.

Figure 10C:
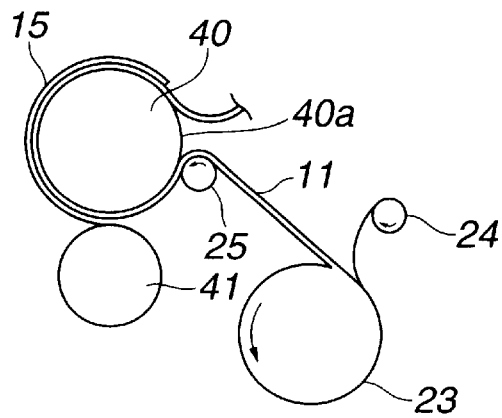

Then, as the light-introducing block for copying 40 is driven to rotate further while the master 15 is held in contact with the hologram recording medium 11, the master 15 wound around the glass-made base member 41 is peeled off from the peripheral surface 41a of the glass-made base member 41 by the adhesive effect of the hologram recording medium 11 and wound around the hologram recording medium 11 that is wound around the peripheral surface 40a of the light-introducing block for copying 40 as shown in FIG. 10C. Thus, the hologram recording medium 11 and the master 15 are wound around and laid on the peripheral surface 40a of the light-introducing block for copying 40 in the above listed order.

Figure 11:
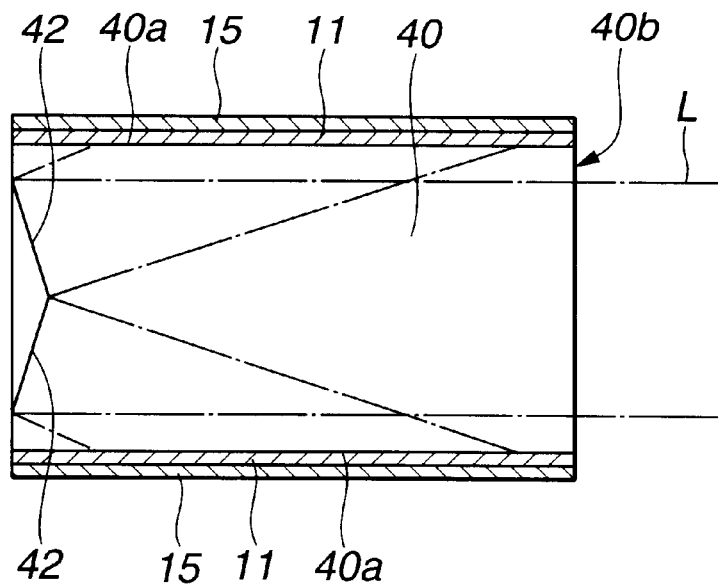
FIG. 11 is also a schematic illustration of the operation of the embodiment of FIG. 10A, showing that reference light is made to strike an end face of the cylindrical copying light-introducing block.

Once the hologram recording medium 11 and the master 15 are wound around and laid on the peripheral surface 40a of the light-introducing block for copying 40, reference light L is made to enter the light-introducing block for copying 40 by way of an end face 40b thereof a shown in FIG. 11. The reference light L entered into the light-introducing block for copying 40 by way of the end face 40b thereof is the reflected by conical reflector mirror 42 arranged at the other end face 40c of the light-introducing block for copying 40 so as to irradiate the hologram recording medium 11 and the master 15 wound around the peripheral surface 40a of the light-introducing block for copying 40a. As a result, the image recorded in the master 15 is copied and recorded in the hologram recording medium 11.

Figure 12:
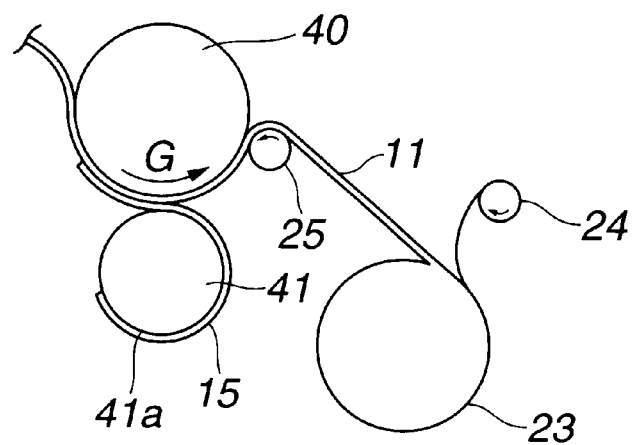
FIG. 12 is also a schematic illustration of the operation of the embodiment of FIG. 10A, showing the master being wound around a glass base member.

Then, as shown in FIG. 12, the light-introducing block for copying 40 is driven to rotate in the sense indicated by arrow G in FIG. 12 so that the master 15 wound around the hologram recording medium 11 is peeled off from the recording medium 11 and comes to be wound around the peripheral surface 41a of the glass-made base member 41.

Thereafter, the hologram recording medium 11 now carrying the image copied and recorded from the master 15 is moved to the second processing section 22 as in the case of the above described image recording apparatus 20, where it is subjected to a post-processing operation involving ultraviolet irradiation and heating. The hologram recording medium 11 that has been subjected to a post-processing operation is then applied onto a reproduction block 37 fed from the reproduction block supply section 36 and having the profile of a rectangular plate. Then, the portion of the hologram recording medium 11 applied onto the reproduction block 37 is cut apart from the remaining portion of the recording medium 11 at the opposite ends thereof to complete the operation of preparing an edge-lit type holographic stereogram.

In this embodiment again, the reproduction block 37 fed from the reproduction block supply section 36 may be molded to have a cylindrical profile. Then, a complete cylindrical edge-lit type holographic stereogram will be prepared by bonding the hologram recording medium 11 carrying an image copied and recorded from the master 15 onto the peripheral surface of the cylindrical reproduction block 37.

While a film-shaped hologram recording medium 11 is moved gradually and bonded onto a light-introducing block for copying 10 or 40 having the profile of a rectangular plate or a cylinder for the operation of exposure to light, after which the hologram recording medium 11 is peeled off from the light-introducing block for copying 10 or 40 and subjected to a post-processing operation typically involving ultraviolet irradiation and heating to complete the operation of preparing an edge-lit type holographic stereogram when the hologram recording medium 11 is applied onto a reproduction block 37 in the above description, an image recording apparatus according to the invention is by no means limited thereto and it may alternatively be so configured that the hologram recording medium 11 is applied onto a reproduction block 37 in advance and fed to a predetermined exposure station so that the operation of exposure to light may be conducted without using a light-introducing block for copying 10.

With such an arrangement, then a reproduction block 37 to which a hologram recording medium 11 is bonded will be supplied to a station that corresponds to the first processing section 21 of the above described image recording apparatus 20. Then, since reference light L is also made to enter the reproduction block 37 by way of an end face thereof, it is desirable that the end face through which reference light is introduced is also mirror-polished to improve the precision level of the entire operation. Additionally, as in the case of the light-introducing block for copying 10 used in the above described image recording apparatus, all the surfaces of the reproduction block 37 are preferably provided with a light absorbing member typically made of black film except the principal surface to which the hologram recording medium 11 is applied and the end face through which reference light is introduced.

Figure 13A:
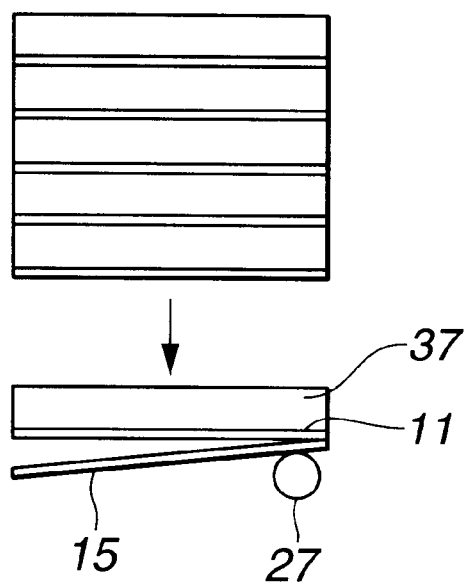
Figure 13B:
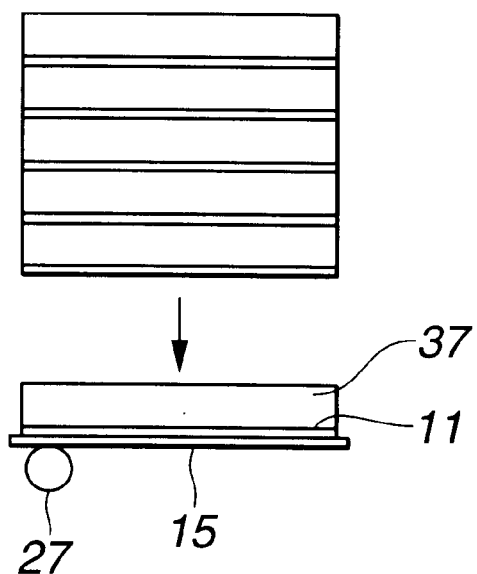

Then, as shown in FIG. 13B and as in the case of the above described image recording apparatus 20, the master applying roller 27 is operated to move from an end to the opposite of the master 15. As a result, the master 15 is entirely brought into tight contact with the hologram recording medium 11 bonded to the reproduction block 37. It is desirable that an index-matching solution 14 is filled between the hologram recording medium 11 and the master 15.

Figure 14:
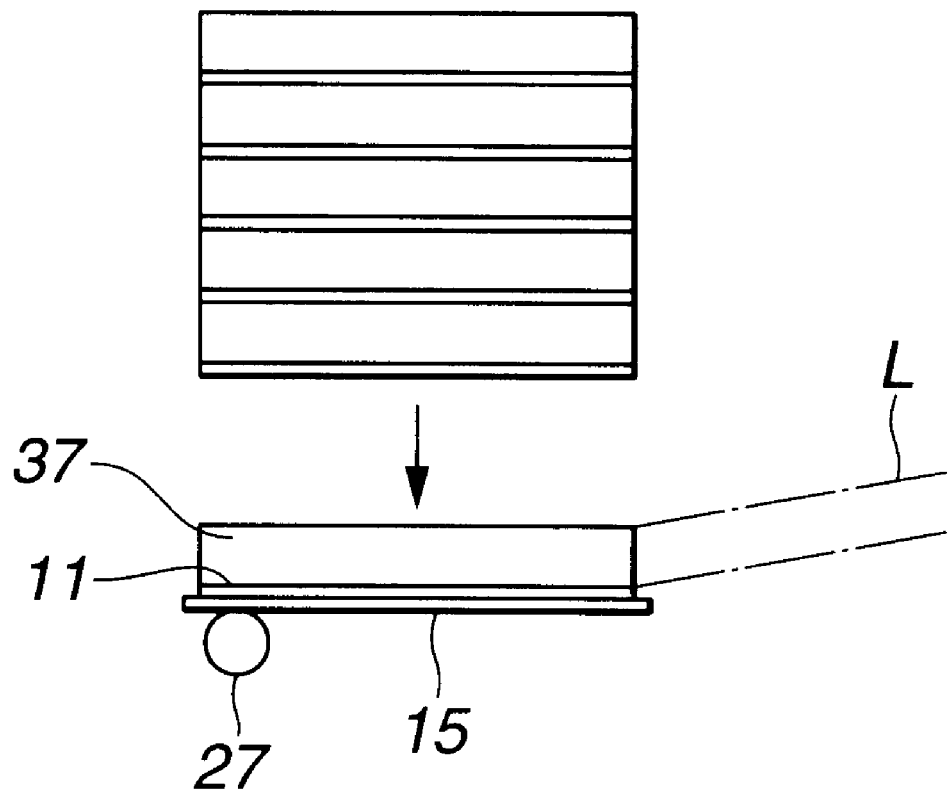
FIG. 14 is also a schematic illustration of the operation of the embodiment of FIG. 13A, showing that reference light is made to strike an end face of the reproduction block.

Then, as shown in FIG. 14, reference light L that is equivalent to reproducing light for reproducing the image of the master 15 is introduced into the reproduction block 37 through an end face thereof while the master 15 is held in contact with the hologram recording medium 11 bonded to the reproduction block 37. As a result, the image recorded in the master 15 is copied and recorded in the hologram recording medium 11 that is bonded to the reproduction block 37.

Then, the master applying roller 27 is moved away from the reproduction block 37 to which the hologram recording medium 11 is bonded and the master 15 is peeled off from the hologram recording medium 11. Then, the hologram recording medium 11 now carrying a copied and recorded image and bonded to the reproduction block 37 is moved sequentially to a ultraviolet irradiation section (not shown) and then to a heating processing section (not shown) for a post-processing operation involving irradiation of ultraviolet rays and heating to complete the operation of preparing an edge-lit type holographic stereogram.

As may be clear from the above description, when the hologram recording medium 11 is exposed to light and subjected to a post-processing operation while it is bonded to a reproduction block 37, the entire configuration of the image recording apparatus can be simplified to by turn simplify the overall process of copying and recording an image in the hologram recording medium 11 if compared with the case where a light-introducing block for copying 10 is used.

While a hologram recording medium 11 is bonded to a light-introducing block for copying 10 or 40 having the profile of a rectangular plate or a cylinder or a reproduction block 37 and held in contact with a master 15 for the operation of exposure to light in the above description, an image recording apparatus according to the invention is by no means limited thereto. For instance, the positional relationship of the hologram recording medium 11 and the master 15 may be reversed and the master 15 may be bonded onto a light-introducing block for copying 10 or 40 having the profile of a rectangular plate or a cylinder or a reproduction block 37 and a hologram recording medium 11 may be held in contact with the master 15 for the operation of exposure to light. Then, the configuration of the image recording apparatus may be further simplified.

What is claimed is:

1. An image recording apparatus for copying image information recorded on a master comprising a holographic stereogram that carries the image information thereon, said image recording apparatus comprising:

an exposure processing section directing a reference light to strike an end face of a light-transmitting block-shaped optical member, a recording material being laid on said master, said master and said recording material being optically held in contact with said optical member, wherein said master is an edge-lit type holographic stereogram;

said reference light enters said optical member with an angle of incidence that generates a reflected light for reproducing the image information of said master in an edge-lit arrangement;

said recording material records an edge-lit type holographic stereogram when said reflected light interferes with said reference light; and said optical member has the same profile as that of an optical member on which the recording material is to be attached after the image information is recorded thereon.

2. The image recording apparatus according to claim 1, wherein said optical member is a light-transmitting block having a rectangular profile, and said recording material, on which the image information is recorded, is to be attached onto another light-transmitting block having the same rectangular profile, said another light-transmitting block allowing light to said recording material attached thereon for reproducing the image information recorded in said recording medium.

3. The image recording apparatus according to claim 1, wherein said optical member has a cylindrical profile, and said recording material, on which the image information is recorded, is to be attached onto a light-transmitting block having the same cylindrical profile, wherein another light-transmitting block allowing light to enter said recording material is attached thereon for reproducing the image information recorded in said recording material.

4. The image recording apparatus according to claim 1, wherein said master comprises a layer of holographic material on which a holographic image is recorded and at least one of a base layer and a protection layer.

5. The image recording apparatus according to claim 1, wherein said recording material comprises a layer of holographic material on which a holographic image is recorded and at least one of a base layer and a protection layer.

6. An image recording method for copying image information recorded on a master comprising a holographic stereogram that carries the image information thereon, said image recording method comprising the steps of:

directing a reference light from an exposure processing section to strike an end face of a light-transmitting block-shaped optical member, a recording material being laid on said master, said master and said recording material being optically held in contact with said optical member; wherein said master is an edge-lit type holographic stereogram, reproducing the image information of said master in an edge-lit arrangement by causing said reference light to enter said optical member at an angle of incidence that generates a reflected reproducing light, recording an edge-lit type holographic stereogram on said recording material when said reflected reproducing light interferes with said reference light, and wherein said optical member has the same profile as that of an optical member on which the recording material is to be attached after the image information is recorded thereon.

7. An apparatus for copying image information recorded on a master comprising a holographic stereogram that carries the image information thereon to a recording material, said apparatus comprising:

a supply section supplying said recording material; and an exposure processing section performing exposure processing on said recording material to produce an edge-lit type holographic stereogram; wherein said exposure processing section comprises:

an arrangement part bringing said recording material that is supplied and said master optically in contact with each other, and bringing them into optical contact with a light-transmitting block-shaped optical member, and an optical system directing a reference light to strike an end face of said optical member; wherein said master is an edge-lit type holographic stereogram;

said reference light enters said optical member at an angle of incidence that generates a reflected light for reproducing the image information of said master in an edge-lit arrangement;

said recording material records an edge-lit type holographic stereogram when said reflected light interferes with said reference light; and said optical member has the same profile as that of an optical member on which the recording material is to be attached after the image information is recorded thereon.

8. The apparatus according to claim 7, wherein said recording material is a film type; and said supply section comprises a storing part storing said recording material; and a transfer part transferring said recording material from said storing part to said arrangement part.

9. The apparatus according to claim 8, wherein said arrangement part comprises a first arrangement part bringing said optical member into optical contact with said recording material that is transferred by said transfer part; and a second arrangement part bringing said master into optical contact with said recording material.

10. The apparatus according to claim 8, wherein said recording material comprises a first layer made of material including a photopolymer, and a second layer protecting said first layer; and said transfer part comprises a second layer removing part removing said second layer during transferring of said recording material.

11. The apparatus according to claim 7, wherein said arrangement part brings said master and said optical member into optical contact with each other, and brings said recording material and said master into optical contact with each other.

* * * * *